Nov. 18, 1969  K. L. BORING ET AL  3,479,483

ELECTRON BEAM WELDER

Filed July 31, 1968  2 Sheets-Sheet 1

Inventors:
Kenneth L. Boring,
Robert D. Downing,
by John J. Kissane
Their Attorney.

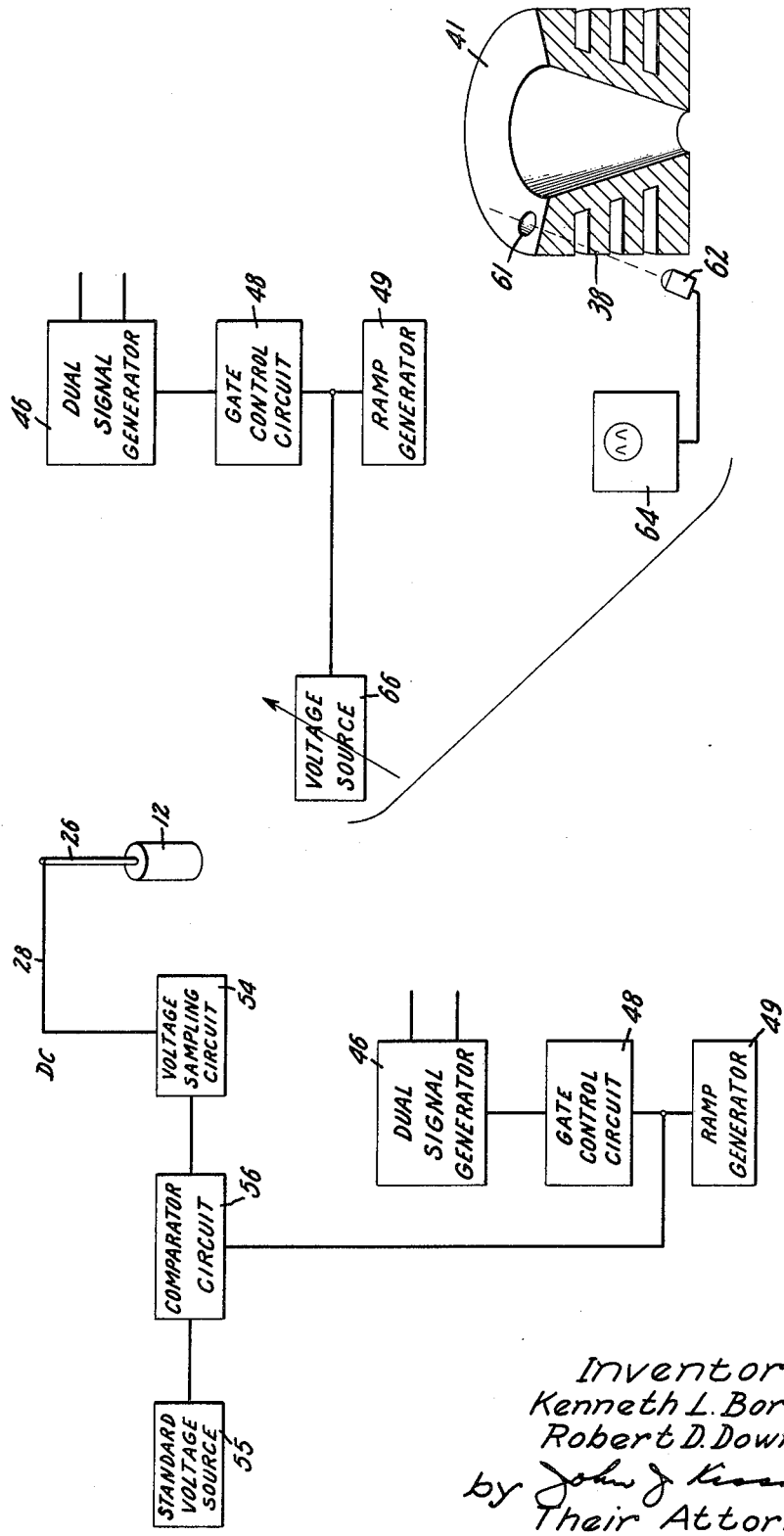

United States Patent Office 3,479,483
Patented Nov. 18, 1969

3,479,483
ELECTRON BEAM WELDER
Kenneth L. Boring, Scotia, N.Y., and Robert D. Downing, Mentor, Ohio, assignors to General Electric Company, a corporation of New York
Filed July 31, 1968, Ser. No. 749,071
Int. Cl. B23k 9/00
U.S. Cl. 219—121                10 Claims

ABSTRACT OF THE DISCLOSURE

Automatic control of the welding intensity of an electron beam welder is achieved by periodically deflecting the beam from the weld to a water cooled copper absorbing surface utilizing simultaneous phase displaced signals applied to $x$ and $y$ beam deflection coils. The application period of the welding beam to the workpiece preferably is controlled by a ramp signal generator to permit an initial gradual increase in the welding period per unit length of the workpiece fed beneath the beam thereby inhibiting workpiece damage upon a startup with the weld interval per unit length of workpiece feed becoming constant after an initial span approximately equal to the work piece thickness. Preferably the welding beam is gradually removed from the workpiece at a rate symmetrical with the initial application signal allowing highly uniform circular welds to be fashioned by an overlapping of the increasing and decreasing weld interval upon a fixed workpiece area. Automatic control of welding power can be achieved by sensing either cathode voltage or beam intensity and subsequently varying the welding period of the beam per unit length of workpiece feed thereby assuring a uniform weld notwithstanding cathode power variations.

---

Figure 1:
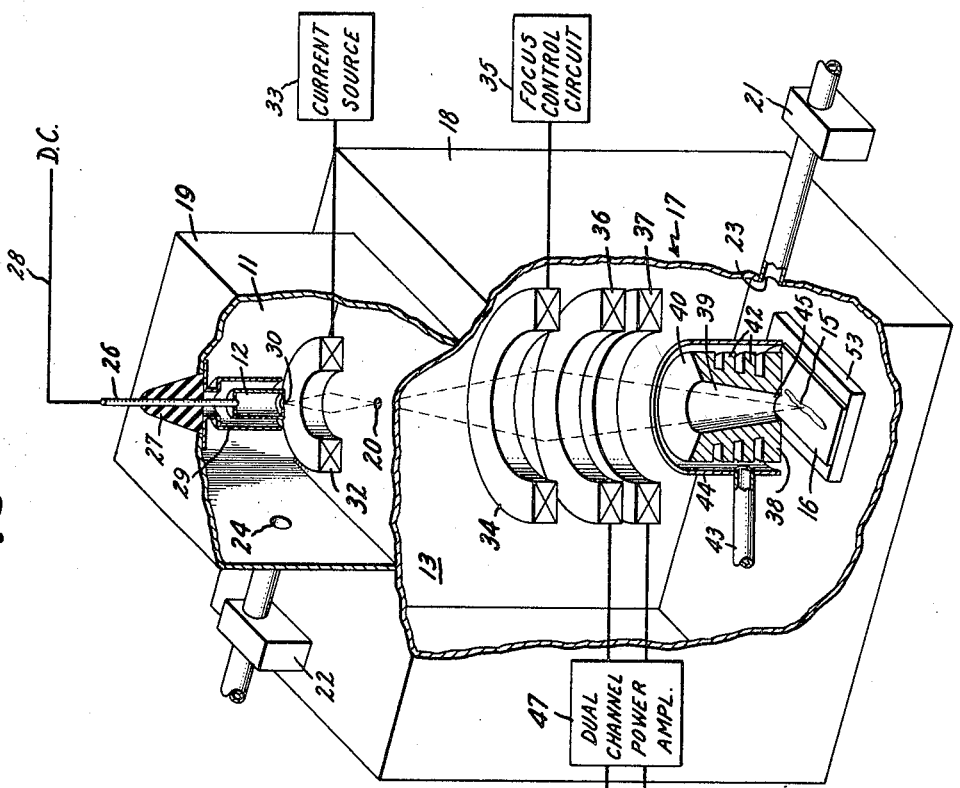

This invention relates to electron beam welders and in particular to electron beam welders having a controlled welding power by variations in the weld interval per unit length of workpiece fed beneath the beam.

Electron beam welding generally is characterized by a precisely focused electron stream which penetrates into a workpiece joint to effect a weld of the joint by conversion to thermal energy at the penetration depth rather than by conventional heat conduction through the workpiece. The initial application of an electron beam of welding intensity to the edge of a workpiece upon startup however often effects a faulty weld because of the nonsymmetrical beam impact area, the rapid localized heating of the joint, and the lack of uniform heat conduction from the area. Thus it heretofore has been common practice to gradually increase beam intensity upon the joint during the initiation of a weld rather than to initially apply a beam of full welding power to the joint. The initial variation in beam intensity upon startup however effects a change in the beam focal point often inhibiting the formation of a deep, sound weld. Particular difficulty occurs in the utilization of a varying intensity beam to form circular welds wherein the initiation and termination of the weld occurs at identical locations. The location of the electron beam focal point also can change during welding, e.g. by a fluctuation in the applied power to the beam generating cathode, requiring sophisticated compensation systems to assure a uniform weld in the workpiece.

It is therefore an object of this invention to provide an electron beam welder capable of gradually applying a beam of welding intensity to a workpiece.

It is also an object of this invention to provide an electron beam welder having a simplified automatic compensation system for beam intensity variations.

It is a further object of this invention to provide an electron beam welder particularly adapted to the formation of circular welds.

It is a still further object of this invention to provide an electron beam welder wherein welding power can be adjusted without a variation in cathode current.

These and other objects of this invention generally are achieved in an electron beam welder by periodically deflecting the welding electron beam off the workpiece for diverse periods during a weld cycle to vary the application time of the beam for a fixed workpiece span passed beneath the beam. Thus an electron beam welder in accordance with this invention would comprise a source for the generation of an electron beam of welding intensity and means for focusing the electron beam upon the joint of a workpiece. Means also are provided for deflecting the electron beam from the workpiece with variable control means governing the operation of the deflecting means for periodically applying the deflection means to the electron beam during a welding cycle in a manner to produce a minimum dwell period of the beam upon the workpiece during the initiation of the welding cycle. Preferably the percent dwell interval upon the workpiece relative to the deflection interval gradually is increased during the initiation period of the welding cycle, e.g. over a span between 50% to 200% of the workpiece thickness, to a constant level effecting a uniform weld along the workpiece. When desired, means can be incorporated into the welder for controlling the electron beam welding power by a variation in the workpiece dwell interval relative to the deflection interval in response to measured variations in the cathode voltage or the electron beam intensity.

Figure 2:
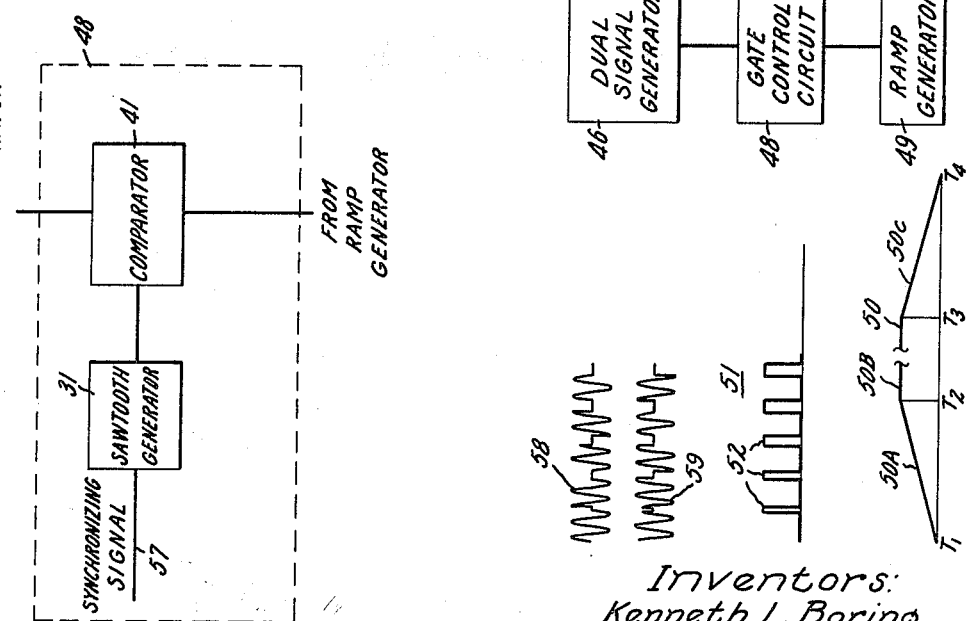

The novel features believed characteristic of the invention are set forth in the appended claims. The invention itself, together with further objects and advantages thereof may best be understood by reference to the following description, taken in accordance with the accompanying drawings, in which:

FIGURE 1 is an isometric view of a welder constructed in accordance with this invention, FIGURE 2 is a block diagram of gate control circuitry suitable for utilization in this invention, FIGURE 3 is a block diagram of a cathode voltage regulated deflection system in accordance with this invention, and FIGURE 4 is a block diagram of an electron beam power regulated deflection system in accordance with this invention.

An electron beam welder permitting a controlled application of a welding intensity beam to a workpiece in accordance with this invention is depicted in FIGURE 1 and generally includes a gun chamber 11 having a cathode 12 therein for the generation of an electron beam, a work chamber 13 wherein the generated electron beam is focused upon the joint 15 of a workpiece 16 to be welded, and electron beam deflection apparatus, generally identified by reference numeral 17, for intermittently removing the electron beam from the workpiece joint to control the welding power applied to a unit length of the joint. The entire welder generally is enclosed to permit pressure control of the individual chambers therein with a housing 18 serving to confine work chamber 13 and a second housing 19 mounted atop housing 18 serving to enclose gun chamber 11. An aperture 20 is centrally disposed in the top of housing 18 in axial alignment with the electron beam generated by cathode 12 to permit passage of the electron beam therethrough while being of narrow diameter to limit gaseous exchange between the work chamber and gun chamber. This diffusion pump 21 in communication with orifice 23 in the side wall of work chamber housing 18 can maintain the work chamber at a pressure less than 500 microns for welding workpiece 16 while diffusion pump 22 connected to orifice 24 in the gun chamber housing can function to maintain the gun chamber at a substantially lower pressure, e.g. $10^{-2}$ to $10^{-6}$ torr, for prolonged cathode life and/or proper operating conditions.

While any suitable electron beam source, e.g. a plasma source or a thermionic source can be employed in accordance with this invention, a plasma source such as is depicted in FIGURE 1 is preferred because of the relatively long operational life of cathodes employed therein and the generally self-collimating beam produced by such sources. Cathode 12 generally is a hollow structure mounted on the lower extremity of conductive rod 26 embedded within insulated bushing 27 to permit suitable external energization of the cathode, e.g. by a 10 to 60 kilovolt D.C. source, through leads 28 and the conductive rod. Interiorly of gun chamber 11, a grounded sheath 29 fixedly secured to housing 19 extends downwardly to shroud cathode 12 thereby effectively limiting the glow discharge of the cathode to the area of orifice 30 in the bottom face of cathode 12. The electron beam emitted by cathode 12 is focused by electromagnetic lens 32, suitably energized by current source 33, to a beam diameter smaller than the diameter of aperture 20 to permit unimpeded passage of the beam into work chamber 13. As the electron beam enters work chamber 13, the slightly diverging beam again is focused by an electromagnetic lens 34 suitably energized by a focus control circuit 35 to impinge upon workpiece 16 in an area preferably less than ¼ inch diameter thereby concentrating the welding intensity of the beam at the joint of the workpiece. A more complete understanding of electron beam welding structure suitable for employment of this invention can be obtained by reference to U.S. Patent No. 3,218,431, issued Nov. 16, 1965 and assigned to the assignee of the present invention.

Electron beam deflection apparatus 17 is situated between focusing lens 34 and workpiece 16 and includes a pair of deflection yokes 36 and 37 circumferentially disposed about the electron beam to deflect the beam along the plane of the workpiece, e.g. in an $x$ and $y$ direction respectively, and a cylindrical copper annulus 38 having an axially disposed frustro-conical bore 39 of a dimension to permit unimpeded passage of the electron beam therethrough. The upper portion of bore 39 is countersunk to provide a beam absorbing surface 40 angularly disposed relative to the electron beam axis and inclined slightly relative to the taper of bore 39. Preferably, the beam absorbing surface is angularly disposed relative to the angle of electron beam deflection produced by yokes 36 and 37 to assure an acute impingement angle, e.g. generally an angle between 15° and 50°, between the deflection beam and absorbing surface 40 to spread the beam over an enlarged area of the absorbing surface. The periphery of annulus 38 is grooved to provide a plurality of fins 42 remote from the beam absorbing surface between which a suitable coolant, e.g. water admitted through conduit 43 and contained by annular jacket 44, may pass. Because annulus 38 is disposed at an elevated position relative to workpiece 16, the apex 45 of the frustro-conical bore preferably is of a diameter approximately twice the diameter of the beam upon the workpiece to be welded to permit unimpeded passage of a properly focused undeflected beam to workpiece 16. When rapid interception of the deflection beam is desired, bore 39 can be positioned relative to focusing lens 34 to intercept the skirts of the undeflected beam, e.g. a portion less than approximately 5% of the total beam power, without seriously impairing the operation of welder 10.

The deflection signals applied to yokes 36 and 37 to cant the beam from an axial location upon workpiece 16 to beam absorbing surface 40 are provided by a gate controlled dual signal generator 46 connected to deflection yokes 36 and 37 through a conventional dual channel power amplifier 47. Generator 46 may be any signal source producing two phase displaced signals at a frequency greater than at least 60 cycles per second, e.g. to assure a rapid traversal of the beam across absorbing surface 40 upon energization of the deflection yokes 36 and 37, and preferably is a conventional gate controlled oscillator, e.g. two operational amplifiers connected in a double integrator circuit, generating a sine and cosine function at approximately 1200 c.p.s. to produce a circular motion of the electron beam by the simultaneous application of the functions to deflection yokes 36 and 37 respectively.

The operation of gate controlled signal generator 46 is regulated by a gate control circuit 48 which circuit produces a fixed frequency square wave output signal 51 having a pulse width proportional to the magnitude of the applied input voltage from ramp generator 49. Thus, gate controlled generator 46, generally functions in the absence of a positive going voltage signal from gate control circuit 48 to continuously deflect the electron beam to beam absorbing surface 40 while a positive going switching pulse 52 from the gate control circuit functions to bias off the generator to permit welding of the workpiece by the undeflected electron beam for the remainder of the pulse period. Although the intermittent applications of the phase displaced pulses to deflection yokes 36 and 37 are disclosed as being regulated by a gate controlled signal generator, any method of controllably applying one or more signals to the deflection coils, e.g. utilizing free running phase displaced oscilators connected to the deflection coils through controlled switches, also can be utilized without departing from the spirit of this invention. Similarly although electromagnetic deflection is shown and described in FIGURE 1, for thermionic operation electrostatic deflection systems may more advantageously be employed.

Suitable gate control circuitry for producing a fixed frequency output signal having a pulse width proportional to the magnitude of the voltage from ramp generator 49 is depicted in FIGURE 2 and basically includes a comparator circuit 41 for the generation of positive going output pulses, e.g. pulse 52, when the potential from a linear sawtooth generator 31 applied as one input to comparator circuit 41 is exceeded by the voltage from ramp generator 49 applied as the other input to the comparator circuit. The maximum amplitude of the signal from sawtooth generator 31 is fixed at a value relative to the amplitude of plateau 50B from ramp generator 49 to effect a weld to deflection interval compatible with both the thickness and the feed rate of workpiece 16 below the welding beam and the frequency of the sawtooth generator is controlled by a synchronizing input signal, generally identified by reference numeral 57, to produce a plurality of sawtooth pulses determinative of the frequency of the output signals from comparator circuit 41. Thus, the maximum amplitude of the sawtooth waveform from generator 31 is determinative of the steady interval between adjacent pulses 52 during the period of plateau 50B and desirably is equal to or slightly, e.g. 5%., in excess of the amplitude of plateau 50B for maximum efficiency while the frequency of waveform 51 is fixed at the frequency of synchronizing input signal 57.

Preferably the output signal from gate control circuit 48, as determined by synchronizing input signal 57, is of a frequency relative to the feed rate of workpiece 16 below the beam to assure a return of a deflected beam to the workpiece before the weld puddle has passed from a location beneath the beam. For example, when workpiece 16 is fed at a rate of two inches per second beneath the beam with the welding intensity of the beam producing a weld puddle diameter of ¼ inch, the frequency of control circuit 48 should be greater than 8 cycles per second. Generally the frequency of the gate control circuit is many fold the minimum required frequency with a 60 cycle per second frequency being conveniently obtainable and suitably utilized for most applications.

Ramp generator 49 produces a signal 50 having a gradual slope 50A from an initial activation point T1 at the commencement of a weld cycle to a plateau level 50B whereupon a constant voltage output is generated until the ramp generator is deenergized to terminate the weld cycle. The output signal for the ramp generator then decreases in a linear slope 50C preferably symmetrical with the rise in voltage at the initiation of the weld cycle. To inhibit damage to the workpiece and assure a uniform area for protracted electron beam alignment, the upward slope of the ramp generator signal should be of a period identical to the period required for workpiece 16 to traverse a linear distance equal to the workpiece thickness. Thus the ramp generator for a ¼ inch thick workpiece fed at a rate of 2 inches per second preferably has a rise time of ⅛ second and approximately seven pulses 52 of gradually increasing width are generated during the rise time for a 60 cycle per second synchronizing signal 57. Because ramp generator 49 is activated only at the initiation and termination of each welding cycle, triggering of the ramp generator can be effected either manually by the operator or automatically by triggering switches positioned along the workpiece. Circuitry suitable for the generation of ramp signal 50 can be found on page 134 of the Silicon Controlled Rectifier Manual, 3rd ed., published by the Rectifier Components Department of the General Electric Company.

In the operation of the welding device of FIGURE 1, cathode 12 is energized by a suitable D.C. source through conductive rod 26 and, because ramp generator 49 has not yet been activated to produce a weld pulse, e.g. a positive going pulse 52, from gate control circuit 48, dual signal generator 46 is operative to energize deflection yokes 36 and 37 with the 1200 cycle per second sine and cosine outputs 58 and 59 from the dual signal generator. Upon energization of the deflection yokes, the electron beam generated by cathode 12 is deflected by the deflection yokes from impinging upon workpiece 16 and the beam is traversed in a generally circular manner across the beam absorbing surface 40 of cylindrical annulus 38. After the generated output from cathode 12 has reached a desired welding intensity and workpiece 16 has been properly aligned within the welder at a location to initially accept a welding pulse, work table 53 upon which the workpiece is situated is traversed beneath the beam in the direction of the joint to be welded whereupon a limit switch (not shown) upon the workpiece activates ramp generator 49 to initiate the welding cycle. The output signal 50 from the ramp generator is fed to gate control circuit 48 wherein the input signal is compared to the relatively high frequency sawtooth waveform from generator 31 and a positive going pulse 52 is generated from the gate control circuit during the interval when the magnitude of ramp signal 50 exceeds the magnitude of the more rapidly increasing sawtooth waveform. The positive going pulse from gate control circuit 48 then is applied to dual signal gentrator 46 to cut off operation of the generator thereby removing the deflecting signals from yokes 36 and 37 and the electron beam returns to a nondeflected position in axial alignment with conical bore 39 in annulus 38 to initiate welding of the underlying workpiece. Preferably the duration of the initial positive going pulse generated by gate control circuit 48 is set to be of relatively small width, e.g. less than 5% of the period of gate control circuit 48, thereby applying initially less than 5% of the potential electron beam weld power to the fixed length of workpiece 16 fed beneath the beam during the initial period of the gate control circuit. After the initial weld with the full intensity beam, the termination of the positive going pulse from gate control circuit 48 (upon the amplitude of the sawtooth waveform exceeding the amplitude of the generated ramp signal) effects a triggering of dual signal generator 46 to again traverse the beam in a circular manner along the beam absorbing surface 40 of annulus 38 until the initiation of the succeeding cycle of the sawtooth waveform whereupon the amplitude of ramp signal 50 again exceeds the amplitude of the sawtooth waveform. Because the applied voltage from the ramp generator to gate control circuit 48 is gradually increased over the ramp period, the pulse width from gate control circuit 48 and the weld interval relative to the beam dwell upon the workpiece is increased in a generally linear manner until the plateau of ramp signal 50 is reached whereupon the beam dwell interval on the workpiece per unit length of workpiece passing beneath the beam, e.g. during a single period of gate control circuit 48, becomes constant at a value effecting a deep sound weld in the workpiece, e.g. preferably a weld period to deflection period ratio greater than 6 to 4. For welding very thin metals however, a smaller weld to deflection ratio may be desirable. Generally the slope of the ramp generator signal should be such relative to the workpiece feed rate that a distance equal to 50% to 200% of the workpiece thickness is traversed before the plateau is reached.

Upon a completion of the weld period, a second limit switch (not shown) upon workpiece 16 initiates a linear decrease in the output voltage signal from ramp generator 49 at time $T_3$ to linearly decrease the width of the generated pulses from gate control circuit 48 thereby gradually increasing the activation interval of dual signal generator 46 until the beam is continuously traversed about the beam absorbing surface 40 of annulus 38. Thus, the beam of welding intensity is gradually removed from the workpiece to terminate the weld at time $T_4$ without an alteration in beam intensity and the variation in electron beam focal point associated therewith.

Because the beam absorbing surface of annulus 38 is located at an elevated position relative to the focal point of the welding electron beam in the plane of workpiece 16, the beam is spread over a relatively wide area of the absorbing surface to inhibit damage thereto. Similiarly the acute disposition of the beam absorbing surface relative to the angle of impingement of the deflected beam also assures an enlarged area over which the heat from the electron beam can be dissipated. Preferably, beam absorbing surface 40 is disposed at an angular attitude of less than 45° relative to the undeflected beam axis to assure an angular impingement of the deflected beam upon the absorbing surface.

Because the electron beam is cycled upon absorbing surface 40 at full welding power both before and during welding of workpiece 16, the focal point of the electron beam can be electronically detected and corrected both before and during welding without adversely affecting the welding of the workpiece utilizing techniques such as are shown in copending application Ser. No. 652,123, filed July 10, 1967 in the name of R. D. Downing and assigned to the assignee of the present invention. Similarly, the location of the full intensity beam upon the workpiece can be visually observed at a non-damaging power level by applying the beam to the workpiece for a short interval, e.g. less than 5% of a gating period.

The linear increase and decrease in electron beam power unit length of workpiece passing beneath the beam during the initiation and termination of electron beam welding makes the welder of FIGURE 1 particularly suitable for forming circular welds. In forming the circular welds, the workpiece area receiving the tapered application of the electron beam at the initiation of the weld cycle again is electron beam irradiated during the tapered removal of the electron beam at the termination of the weld period. Thus approximately equal energy per unit length is provided over the entire length of the joint being welded without having an abrupt initiation or termination of the weld.

The deflection apparatus of this invention is especially useful to permit the insertion and removal of workpiece 16 from work chamber 14 without a shutting down of the electron beam. To effect such result, a suitable vacuum valve (not shown) is situated in aperture 20 and the electron beam deflection apparatus, e.g. annulus 38 and deflection yokes 36 and 37, are situated within gun chamber 11 below electromagnetic lens 32. When removal of the workpiece from the work chamber is desired, deflection yokes 36 and 37 are energized by dual signal generator 46 to traverse the full energy beam across beam absorbing surface 40 of annulus 38 and work chamber 13 can be opened to permit an interchange of workpieces with the vacuum valve in aperture 20 inhibting contamination of the gun chamber through the aperture. After insertion of the new workpiece, the work chamber is again closed and pumped down to a suitable pressure for welding. The vacuum valve can then be opened and welding can commence without the conventional delay required to pump the gun chamber to an operational pressure. Similarly, electron beam deflection apparatus 17 alternatively may be situated between lens 34 and aperture 20 to permit a closer positioning of the workpiece to the focusing lens.

Because the dwell period of the electron beam on the beam absorber surface relative to the dwell period of the electron beam on the workpiece surface to be welded determines the amount of power applied to a unit length of workpiece joint, fluctuations in welding power such as are commonly produced by a variation in the applied cathode voltage can be corrected utilizing the circuitry of FIGURE 3 to vary the respective dwell periods of the beam. In effecting this result, a portion of the applied voltage to cathode 12 is sampled by a voltage sampling circuit 54 and compared to a standard voltage source 55 in comparator circuit 56 to produce a voltage output from the comparator circuit proportional to variations in the cathode voltage from a fixed level. The output voltage from comparator circuit 56 then is added to the generated output signal from ramp generator 49 in a polarity to increase the applied signal to gate control circuit 48 upon a lowering of the voltage applied to the cathode. The additive signal from comparator circuit 56 increases the pulse width of the generated signal from gate control circuit 48 thereby increasing the dwell period of the beam upon the workpiece tending to maintain electron beam power upon the joint at a constant level. Similarly, should the applied voltage to the cathode increase, the error voltage from comparator circuit 56 would be subtractive relative to the ramp signal 50 thereby decreasing the width of the pulses from gate control circuit 48 to provide for a longer dwell period of the electron beam upon absorbing surface 40 to regulate the power applied to the workpiece. Preferably, when utilizing regulating techniques to control the beam dwell interval upon the workpiece, plateau voltage 50B from ramp generator 49 should effect a generated signal from gate control circuit 48 having a pulse width between 50% and 80% of the generated signal period to permit variation in the pulse width of the signal from gate control circuit 48 with changes in electron beam intensity, e.g. the maximum amplitude of the linear sawtooth waveform from generator 31 preferably should lie between approximately 125% and 200% of the amplitude of plateau 50B of ramp signal 50. Thus, error voltages from comparator circuit 56 additive or subtractive relative to ramp generator 50 ideally can effect variations in the applied period of asynchronous pulses to the deflection yokes to produce between 2–99% application of the beam to a fixed workpiece length.

Because a variation in the voltage applied to cathode 12 also effects a nonlinear variation in the current generated by the cathode, the control circuitry of FIGURE 3 is most advantageously utilized with an automatic pressure control system, such as is disclosed in U.S. Patent No. 3,243,570, issued Mar. 29, 1966 in the name of K. L. Boring and assigned to the assignee of the present invention. With such a system, beam current is automatically stabilized by an electromechanical transducer controlling the pressure of the gaseous medium within the gun chamber, and electron beam power then becomes a linear function only of the applied voltage to the cathode. Thus to regulate electron beam power to the workpiece, the output signal from comparator circuit 56 can vary linearly with fluctuations in cathode voltage rather than being programmed for a nonlinear relationship to correct for current changes, such as are depicted graphically in the heretofore mentioned K. L. Boring patent, with variations in applied cathode voltage.

Because the electron beam generally is traversed across beam absorbing surface 40 at frequent intervals, e.g. preferably at least every 0.1 second, the beam current can be directly sensed by aperturing beam absorbing surface 40 at a location 61 traversed by the deflected electron beam and positioning an electron beam sensor, such as Faraday cage 62, below the aperture in axial alignment with a deflected beam as is shown in FIGURE 4. The signal generated from the Faraday cage upon electron beam impingement is fed to visual recording means, such as oscilloscope 64 or a chart recorder, to produce a display in a magnitude indicative of the intensity of the impinging electron beam upon each traversal. Any sustained variation of the displayed signals from a norm then permits the operator to manually adjust voltage source 66 connected to gate control circuit 48 by an empirical amount thereby varying both the pulse width of the output signal from the gate control circuit and the generation period of gate controlled dual pulse generator 46 to alter the dwell interval of the electron beam upon workpiece 16. In this manner, a constant welding power can be applied to a fixed length of the workpiece traversal beneath the beam notwithstanding variations in intensity of the electron beam.

When automatic control of the dwell interval of the electron beam upon the workpiece is desired, the output signal from Faraday cage 62 can be fed to a peak reader circuit (not shown) to produce a D.C. output signal proportional to the pulse height of the applied current signal from the Faraday cage. The output signal from the peak reader then is applied in a proper polarity to gate control circuit 48 (in place of the operator controlled output signal from voltage source 66) to vary the pulse width from the gate control circuit and the dwell interval of the beam upon the workpiece.

While the invention has been described with respect to certain specific embodiments, it will be appreciated that many modifications and changes may be made without departing from the spirit of the invention. For example, any type of heat treatment, e.g. brazing or regulation of a melt temperature, can be effected by the apparatus of this invention. We intend, therefore, by the appended claims, to cover all such modifications and changes as fall within the true spirit and scope of our invention.

What we claim as new and desire to secure by Letters Patent of the United States is:

1. An electron beam welder comprising a source for the generation of an electron beam of welding intensity, means for focusing said electron beam upon a workpiece, means for deflecting said electron beam from said workpiece and control means for periodically applying said deflection means to said electron beam during a welding cycle, said control means producing a minimum dwell period of said beam upon said workpiece during the initiation of the weld cycle with the percent dwell interval upon said workpiece relative to the deflection interval of said beam gradually increasing to a constant level.

2. An electron beam welder according to claim 1 wherein said dwell period is linearly increased per unit workpiece length during the initiation of a welding cycle over an initial distance between 50% and 200% of workpiece thickness.

3. An electron beam welder according to claim 1 wherein said electron beam is removed from said workpiece at the termination of the feld by said control means gradually decreasing said workpiece dwell interval from said constant level to said minimum dwell interval.

4. An electron beam welder according to claim 1 further including means for sensing the intensity of said deflected beam and means responsive to said sensing means for regulating the deflection period for said beam during welding to maintain a constant weld energy per unit length of said workpiece.

5. An electron beam welder according to claim 1 further including means responsive to variations in said electron beam source supply voltage for controlling the weld period of said beam upon said workpiece.

6. An electron beam welder comprising a source for the generation of an electron beam of welding intensity, means for focusing said electron beam upon a workpiece, absorption means positioned adjacent said beam at a location remote from said electron beam focal point, means for deflecting said electron beam from said workpiece to said absorption means, and control means for periodically applying said deflection means to said electron beam during a weld cycle, the application interval of said deflection means to said electron beam per unit length of said workpiece being a maximum at the initiation of said weld period and progressively decreasing to provide, after a predetermined interval, a constant weld energy per unit length of said workpiece.

7. An electron beam welder according to claim 6 wherein said deflection means includes a voltage source and deflection apparatus energized by said voltage source and further comprising means for the generation of a ramp signal, means for applying said ramp signal to said control means, said control means generating output pulses having widths proportional to the magnitude of said ramp signal and means for applying said output signals from said control means to said deflecting means to control the application of said voltage source to said deflection apparatus.

8. An electron beam welder according to claim 7 wherein said voltage source generates dual phase displaced pulses.

9. An electron beam welder according to claim 6 wherein said absorption means include a cooled surface acutely disposed relative to the impinging direction of said deflected electron beam thereon.

10. An electron beam welder according to claim 6 wherein said cooled surface is disposed at an angle between 15° and 50° relative to the deflected beam.

References Cited

UNITED STATES PATENTS

| | | | |
|---|---|---|---|
| 2,472,803 | 6/1949 | Beyer et al. | 219—125 |
| 2,956,169 | 10/1960 | King et al. | 219—121 |
| 2,987,610 | 6/1961 | Steigerwald | 219—121 |
| 3,395,279 | 7/1968 | Moore | 219—121 |
| 3,326,176 | 6/1967 | Sibley | 219—121 |
| 3,401,253 | 9/1968 | Foster | 219—121 |
| 3,408,474 | 10/1968 | Downing | 219—121 |

JOSEPH V. TRUHE, Primary Examiner

W. D. BROOKS, Assistant Examiner